(12) United States Patent
Golan

(10) Patent No.: US 12,458,377 B2
(45) Date of Patent: Nov. 4, 2025

(54) HEART VALVE TREATMENT MEMBERS WITH CHANGEABLE ORIENTATION

(71) Applicant: Pi-Cardia Ltd., Rehovot (IL)

(72) Inventor: Erez Golan, Rehovot (IL)

(73) Assignee: Pi-Cardia Ltd., Rehovot (IL)

( * ) Notice: Subject to any disclaimer, the term of this patent is extended or adjusted under 35 U.S.C. 154(b) by 333 days.

(21) Appl. No.: 18/004,095

(22) PCT Filed: Jul. 6, 2021

(86) PCT No.: PCT/IB2021/056025
§ 371 (c)(1),
(2) Date: Jan. 3, 2023

(87) PCT Pub. No.: WO2022/009077
PCT Pub. Date: Jan. 13, 2022

(65) Prior Publication Data
US 2023/0255652 A1     Aug. 17, 2023

Related U.S. Application Data

(60) Provisional application No. 63/048,664, filed on Jul. 7, 2020.

(51) Int. Cl.
*A61B 17/22* (2006.01)
*A61B 17/00* (2006.01)

(52) U.S. Cl.
CPC .... *A61B 17/22* (2013.01); *A61B 2017/00243* (2013.01); *A61B 2017/22098* (2013.01)

(58) Field of Classification Search
CPC ........... A61B 2017/00243; A61B 2017/22098; A61B 2017/2212; A61B 17/22; A61B 17/221

USPC ......................................................... 606/128
See application file for complete search history.

(56) References Cited

U.S. PATENT DOCUMENTS

| | | | |
|---|---|---|---|
| 2009/0306582 A1* | 12/2009 | Granada | A61B 17/320725 606/159 |
| 2012/0253358 A1 | 10/2012 | Golan | |
| 2014/0316428 A1 | 10/2014 | Golan | |
| 2018/0098779 A1 | 4/2018 | Betelia | |
| 2019/0099193 A1* | 4/2019 | Golan | A61B 17/3207 |
| 2020/0197033 A1 | 6/2020 | Pasquino | |
| 2020/0323545 A1* | 10/2020 | Or | A61B 17/22 |

FOREIGN PATENT DOCUMENTS

EP        3435891        2/2019

OTHER PUBLICATIONS

PCT Search Report and Written Opinion PCT/IB2021/056025, Nov. 9, 2021.

* cited by examiner

*Primary Examiner* — Jocelin C Tanner
(74) *Attorney, Agent, or Firm* — Dekel Patent Ltd.; David Klein

(57) ABSTRACT

A device (30) for fracturing calcifications in heart valves includes a first heart valve treatment member (12) that extends from a first shaft (20) and which includes a scoring portion (16). A second heart valve treatment member (32) extends from a second shaft (36) and has a counterforce member (34). The second heart valve treatment member (32) and counterforce member (34) are coupled to the second shaft (36) with a brace (35) arranged to bear a force applied by scoring portion (16) to the counterforce member (34).

10 Claims, 6 Drawing Sheets

HEART VALVE TREATMENT MEMBERS WITH CHANGEABLE ORIENTATION

FIELD OF THE INVENTION

The present invention generally relates to devices and methods for fracturing calcifications in heart valves, such as aortic valve leaflets.

BACKGROUND OF THE INVENTION

The aortic valve is normally a tricuspid valve. Bicuspid aortic valve (BAV) is the most common congenital cardiac malformation. BAV can occur in an isolated form or in association with other congenital malformations, such as coarctation of the aorta (CoA).

Although some patients with isolated BAV remain asymptomatic throughout their lifetime, others develop severe cardiac complications from an early age onwards, such as aortic valve stenosis, aortic insufficiency and/or endocarditis.

Different types of BAV exist and are distinguishable based on the presence and number of raphes. A raphe is the conjoined area of two leaflets, generally a malformed commissure between both leaflets. When no raphe is present, the valve is called strictly bicuspid. Most BAVs consist of one free leaflet and two leaflets that are conjoined (or have failed to separate during embryonic development). BAV morphologies include type 1, in which there is fusion of the right and left coronary cusps; type 2, in which there is right and non-coronary cusp fusion; and the rare type 3 with left and non-coronary cusp fusion.

The presence of raphes presents a challenge for dealing with stenotic valves. For example, as seen in FIG. 1, a BAV may have calcifications on the leaflets L and on the raphe R. These calcifications can impair the functionality of the valve. Furthermore, the presence of calcifications presents a challenge in a transcatheter aortic valve replacement (TAVR) procedure.

SUMMARY OF THE INVENTION

The present invention seeks to provide further impactor devices that may be used for fracturing calcifications in aortic valve leaflets, in order to increase leaflet pliability and mobility, either as standalone treatment, bridge treatment or preparation of the "landing zone" for trans-catheter valve implantation.

The term "fracture" refers to any kind of reduction in size or any modification in shape or form, such as but not limited to, fracturing, pulverizing, breaking, grinding, chopping and the like.

There is provided in accordance with an embodiment of the invention a device for fracturing calcifications in heart valves including a first heart valve treatment member that extends from a first shaft and which includes a scoring portion, and a second heart valve treatment member that extends from a second shaft and which includes a counterforce member, the first and second heart valve treatment members being arranged for sandwiching a portion of a valve anatomy between the scoring portion and the counterforce member, and wherein the first heart valve treatment member is movable with respect to the second heart valve treatment member such that a position and an orientation of the scoring portion is changeable from being parallel to a commissure of the valve or perpendicular thereto.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
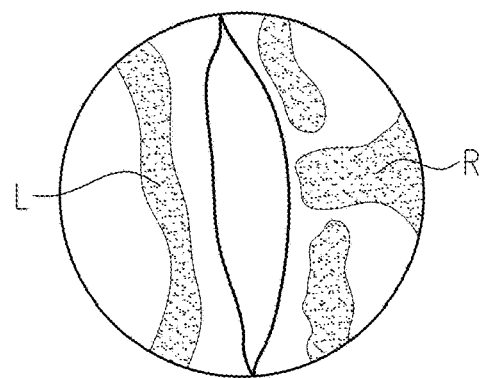
FIG. 1 is a simplified pictorial illustration of a bicuspid aortic valve (BAV) of the prior art, which has calcifications on the leaflets and on the raphe.
Figure 2:
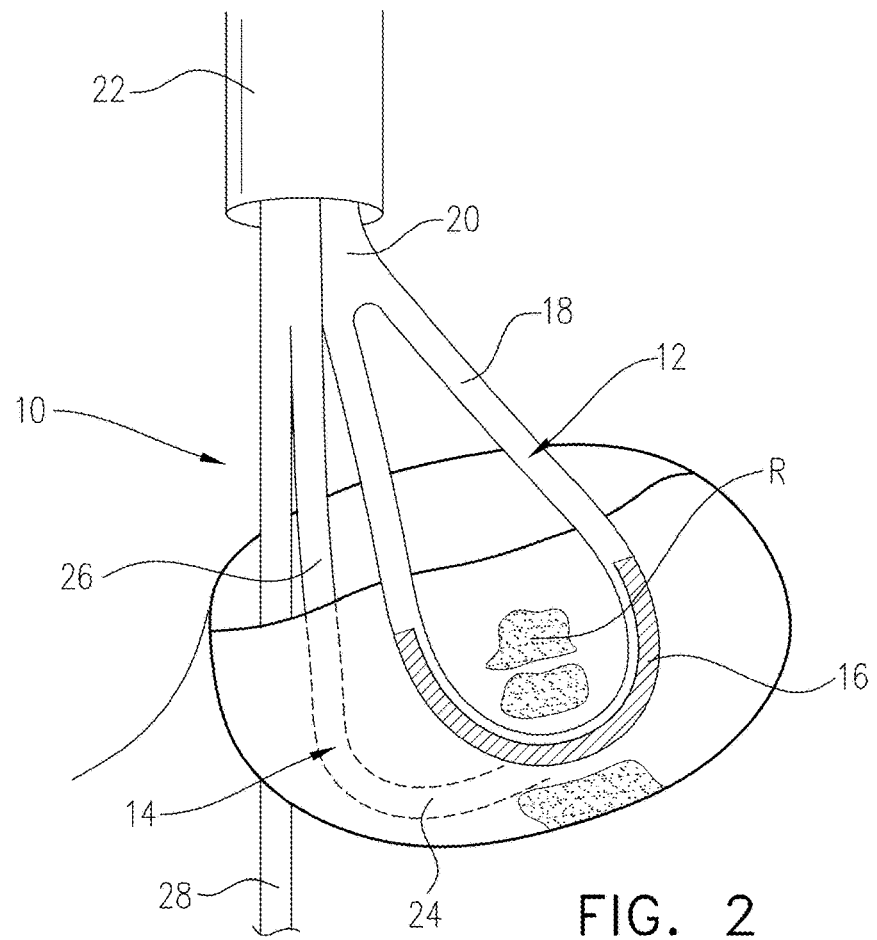
FIG. 2 is a simplified pictorial illustration of a heart valve treatment device, in accordance with a non-limiting embodiment of the invention, which includes two heart valve treatment members that apply a force and a counterforce to score calcifications or to cut a portion of the valve anatomy, such as the raphe.

Reference is now made to FIG. 2, which illustrates a heart valve treatment device 10, in accordance with a non-limiting embodiment of the invention.

Device 10 includes first and second heart valve treatment members 12 and 14. First heart valve treatment member 12 may include a scoring portion 16 that may extend from a frame 18, which in turn may extend from a first shaft 20, which may be delivered through a catheter 22. The term "scoring" refers to any kind of reduction in size or any modification in shape or form, such as but not limited to, scoring, cutting, fracturing, pulverizing, breaking, grinding, chopping and the like.

In the illustrated embodiment, scoring portion 16 is arcuate and extends from two arms of frame 18. The scoring portion 16 and frame 18 thus form a closed arcuate structure (e.g., loop-shaped) that extends from the first shaft 20.

Second heart valve treatment member 14 may include a counterforce member 24 that extends from a second shaft 26. The counterforce member 24 may be bent or bendable to align with scoring portion 16. Both heart valve treatment members may be constructed, without limitation, of a stainless steel alloy, titanium alloy, chromium-cobalt alloy or shape memory alloy, for example. The first and second heart valve treatment members 12 and 14 may be delivered over a guidewire 28 through catheter 22. The portion of the heart valve anatomy which is to be treated may be sandwiched between the counterforce member 24 of second heart valve treatment member 14 and the scoring portion 16 of first heart valve treatment member 12. Then one or both of the first and second heart valve treatment members 12 and 14 may be moved to apply a force and a counterforce to score calcifications or to cut that portion of the valve anatomy.

In one non-limiting example, guidewire 28 may be moved through a blood vessel, such as a peripheral artery, using a retrograde approach, through the aortic arch and into the ascending aorta, and then through the aortic valve into the left ventricle. The delivery catheter 22 is then moved over the guidewire 28 and delivers second heart valve treatment member 14 through the ascending aorta into the aortic root and through the aortic annulus into the left ventricle, inferior to the aortic valve. The first heart valve treatment member 12 may be delivered over the same guidewire 28 through the ascending aorta and then through the sinotubular junction into the Valsalva sinuses of the aortic root, just above the cusps of the aortic valve, so that the first heart valve treatment member 12 is superior to the leaflets and the second heart valve treatment member 14 is inferior to the leaflets. However, other approaches may be used so that the first heart valve treatment member 12 is inferior to the leaflets and the second heart valve treatment member 14 is superior to the leaflets. In other embodiments, they may be on the same side of the leaflets, as described below.

Figure 4A:
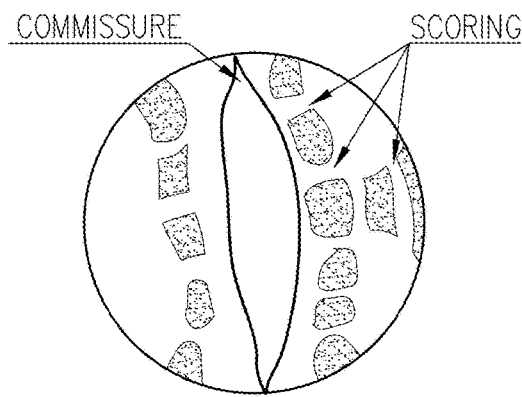
FIGS. 4A and 4B are simplified pictorial illustrations of a valve (such as the BAV), in which calcifications which have been scored by any of the devices of the invention, respectively showing closing and opening of the valve.
Figure 4B:
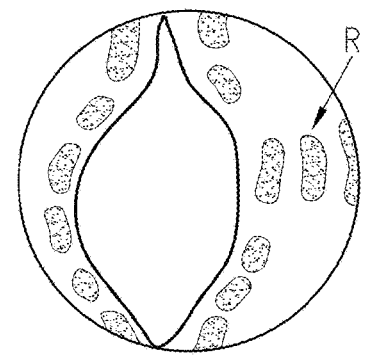

Examples of scored calcifications on leaflets and the raphe are shown in FIGS. 4A and 4B. The position and orientation of the scoring portion 16 of first heart valve treatment member 12 may be changed from being parallel to the commissure of the valve cusps (for making vertical scoring lines in the sense of FIG. 4A, such as in the raphe) or perpendicular thereto (for making horizontal scoring lines in the sense of FIG. 4A, such as on the leaflets at either side of the commissure) or anything in between.

Figure 3A:
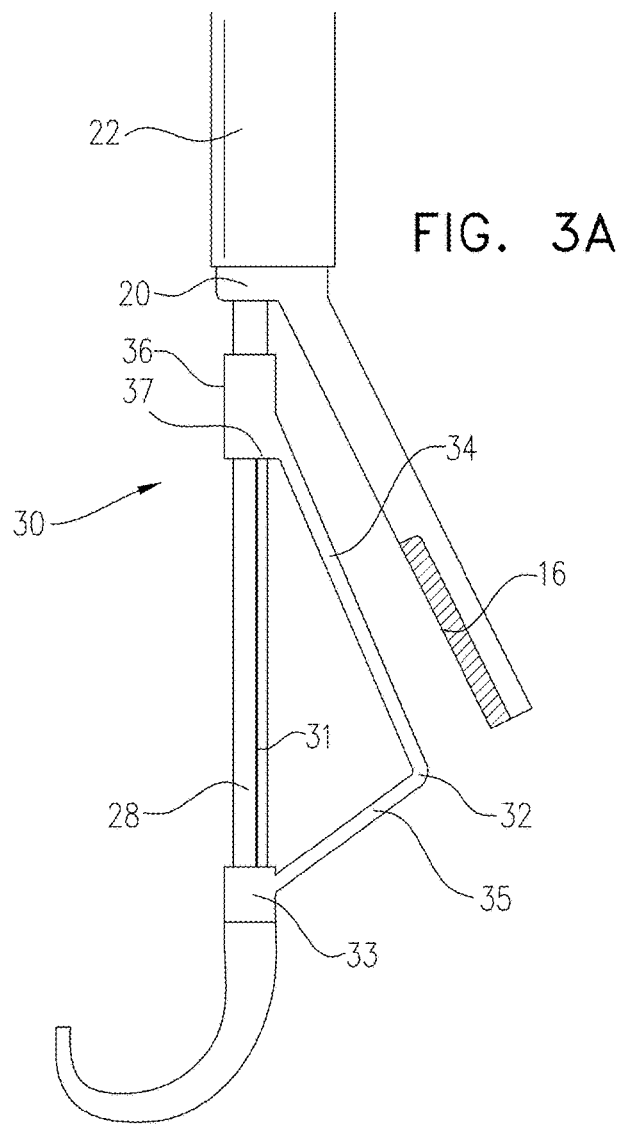
FIGS. 3A and 3B are simplified pictorial illustrations of a heart valve treatment device, in accordance with another non-limiting embodiment of the invention, which also includes two heart valve treatment members that apply a force and a counterforce to score calcifications or to cut a portion of the valve anatomy.
Figure 3B:
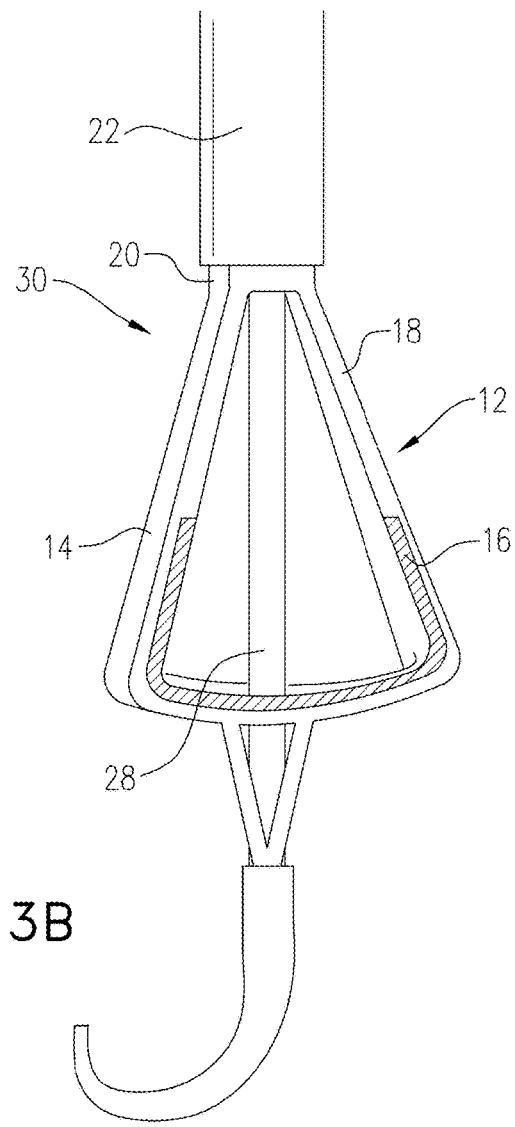

Reference is now made to FIGS. 3A and 3B, which illustrate a heart valve treatment device 30, in accordance with another non-limiting embodiment of the invention. Device 30 is similar to device 10, and like elements are designated by like numerals. Device 30 differs from device 10 in the structure and orientation of a second heart valve treatment member 32 (all other structural features described for device 10 apply as well to device 30). The second heart valve treatment member 32 may include a counterforce member 34 that extends from a second shaft 36. In the illustrated embodiment, an upper portion 37 of second shaft 36 is coupled by a link member 31 to a lower portion 33 of second shaft 36, and link member 31 is an elongate spine member. An advantage of this construction is that the guidewire 28 is visible between the upper and lower portions of second shaft 36. Alternatively, link member 31 may be a complete or partially complete cylinder. In any case, second shaft 36 extends down to the shown position of lower portion 33. The second heart valve treatment member 32 and counterforce member 34 may be coupled to second shaft 36 (e.g., its lower portion) with a brace 35. The brace 35 bears the force applied by scoring portion 16 to counterforce member 34. The counterforce member 34 and the scoring portion 16 of first heart valve treatment member 12 are not parallel to guidewire 28. The brace 35 may be tilted with respect to counterforce member 34.

Accordingly, in device 30 the portion of the heart valve anatomy which is to be scored or cut is also sandwiched between first heart valve treatment member 12 and second heart valve treatment member 32, but both first heart valve treatment member 12 and second heart valve treatment member 32 are delivered to the same side of the valve anatomy, unlike in device 10 where they are delivered to opposite sides of the valve anatomy. Movement of first heart valve treatment member 12 and second heart valve treatment member 32 towards each other along guidewire 28 causes scoring portion 16 to score tissue situated between first heart valve treatment member 12 and second heart valve treatment member 32. Movement of first heart valve treatment member 12 and second heart valve treatment member 32 towards each other along guidewire 28 includes movement of first heart valve treatment member 12 with second heart valve treatment member 32 being stationary, or movement of second heart valve treatment member 32 with first heart valve treatment member 12 being stationary, or movement of both first heart valve treatment member 12 and second heart valve treatment member 32 towards each other.

Figure 5A:
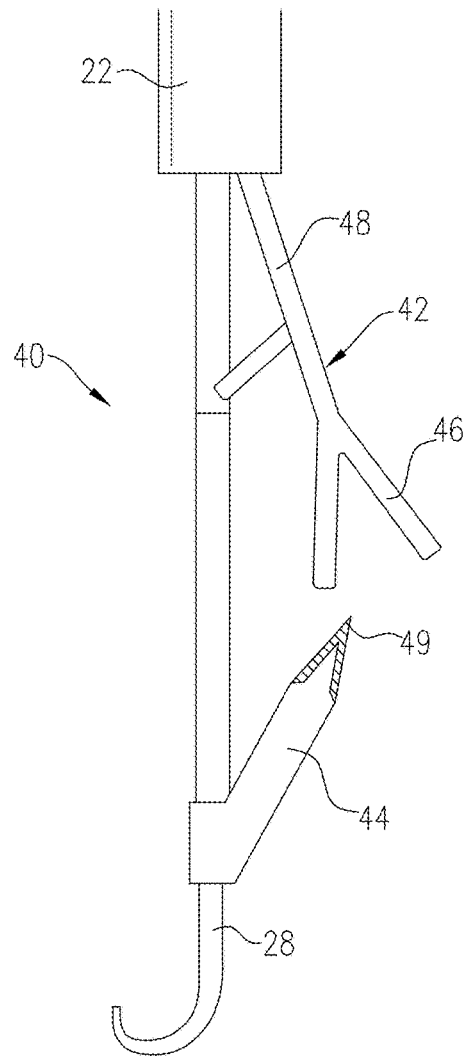
FIGS. 5A and 5B are simplified pictorial illustrations of a heart valve treatment device, in accordance with yet another non-limiting embodiment of the invention, which also includes two heart valve treatment members that apply a force and a counterforce to score calcifications or to cut a portion of the valve anatomy.
Figure 5B:
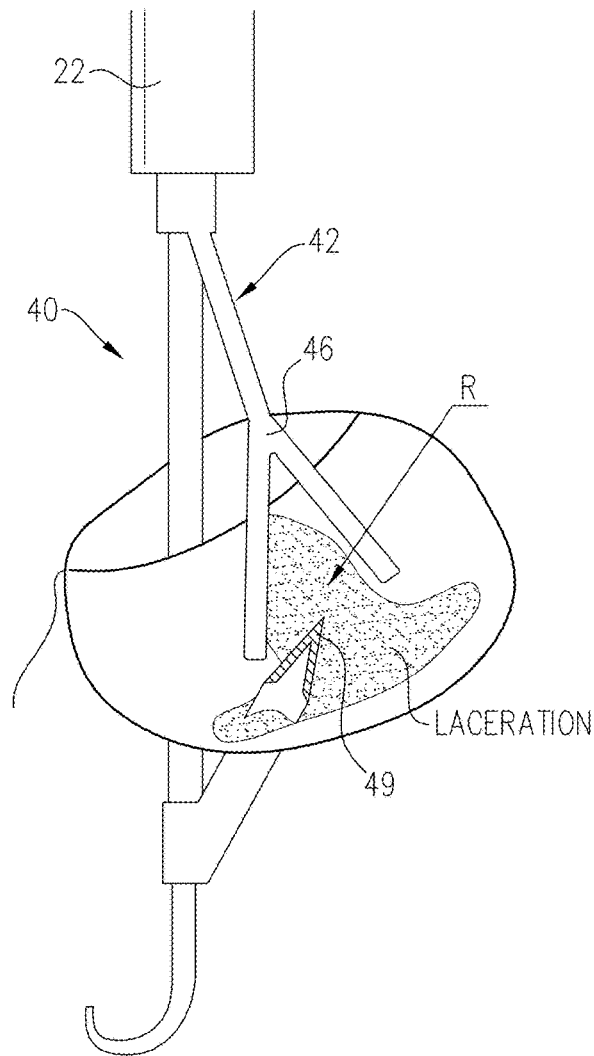

Reference is now made to FIGS. 5A and 5B, which illustrate a heart valve treatment device 40, in accordance with yet another non-limiting embodiment of the invention.

Device 40 includes first and second heart valve treatment members 42 and 44. First heart valve treatment member 42 may include one or more positioning arms 46 that may extend from a shaft 48, which may be delivered through a catheter 22. Second heart valve treatment member 44 may include a blade 49. As seen in FIG. 5B, blade 49 can cut or lacerate the raphe R, with the raphe being supported or held by the positioning arms 46, which serve as counterforce members to blade 49.

Figure 6A:
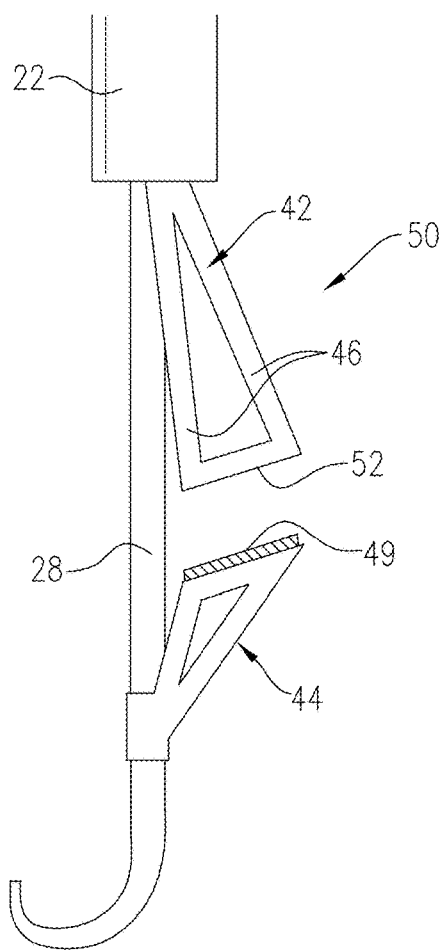
FIGS. 6A, 6B and 6C are simplified pictorial illustrations of a heart valve treatment device, in accordance with yet another non-limiting embodiment of the invention, which also includes two heart valve treatment members that apply a force and a counterforce to score calcifications or to cut a portion of the valve anatomy.
Figure 6B:
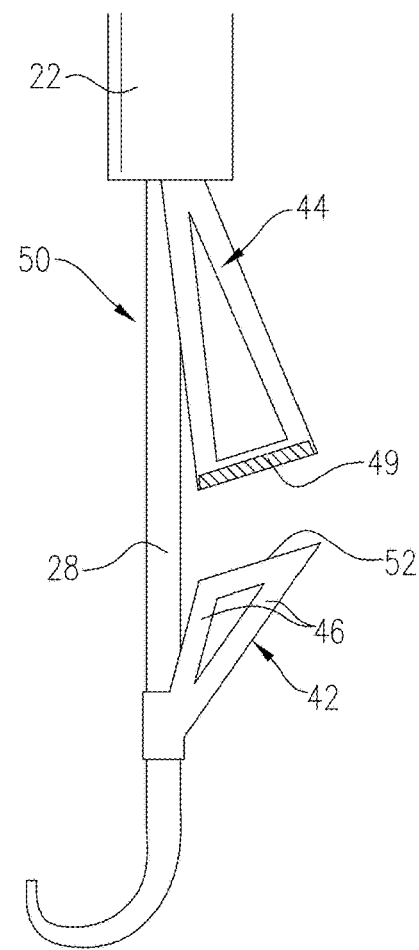
Figure 6C:
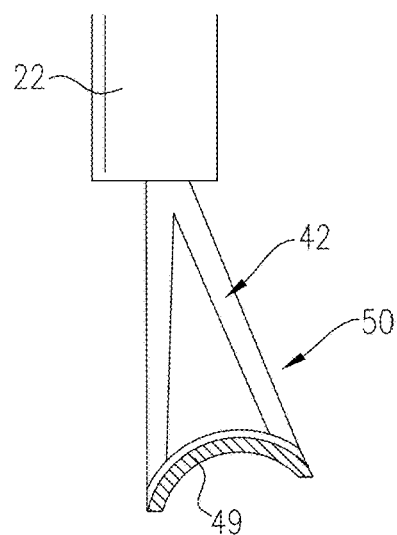

Reference is now made to FIGS. 6A, 6B and 6C, which illustrate a heart valve treatment device 50, which is similar to device 40, but with structural variations. In FIG. 6A, the positioning arms 46 may be connected by a cross-member 52, which is parallel to blade 49. In FIG. 6B, the relative position (distal versus proximal) of first and second heart valve treatment members 42 and 44 has been switched. In FIG. 6C, blade 49 may be arcuate and may operate without cutting against first heart valve treatment member 42.

Figure 7A:
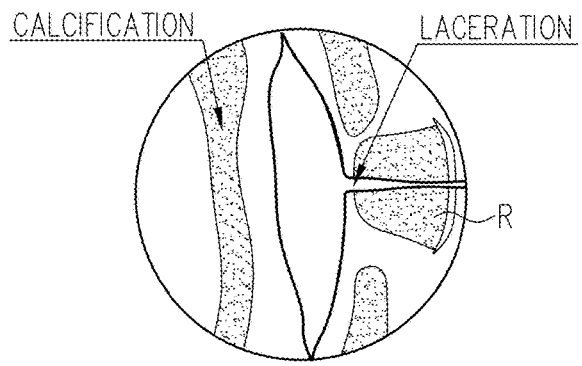
FIGS. 7A, 7B and 7C are simplified pictorial illustrations of different lacerations or cuts made in the valve anatomy with any of the devices of the invention, in which the laceration is respectively radially into the raphe, radially next to the raphe, and circumferentially on the raphe near its periphery.
Figure 7B:
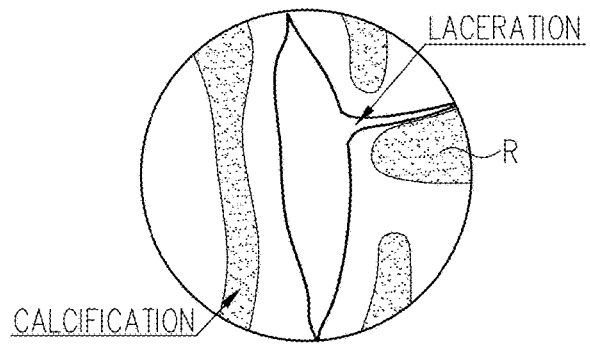
Figure 7C:
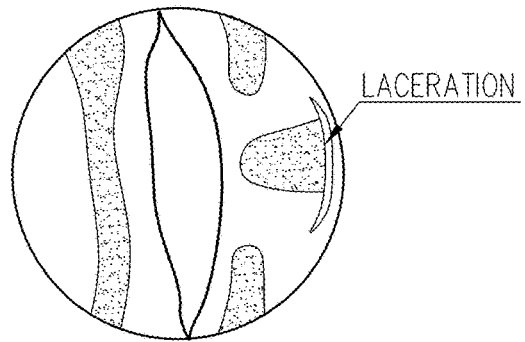

Reference is now made to FIGS. 7A, 7B and 7C. Any of the devices of the invention may be used to make different lacerations or cuts in the valve anatomy, such as radially into the raphe (FIG. 7A), radially next to the raphe (FIG. 7B), or circumferentially on the raphe near its periphery (FIG. 7C).

Reference is now made to FIGS. 8A-8E, which illustrate a method for lacerating the raphe and introducing a replacement valve in a TAVR procedure, in accordance with a non-limiting embodiment of the invention.

Figure 8A:
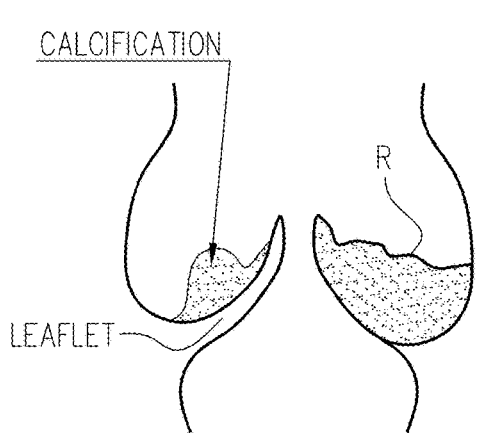
FIGS. 8A-8E are simplified pictorial illustrations of lacerating the raphe and introducing a replacement valve in a TAVR procedure, in accordance with a non-limiting embodiment of the invention.
Figure 8B:
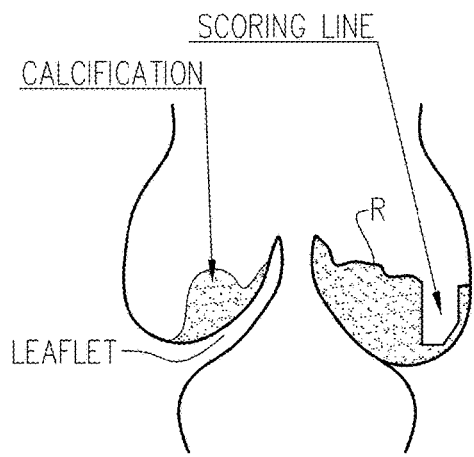
Figure 8C:
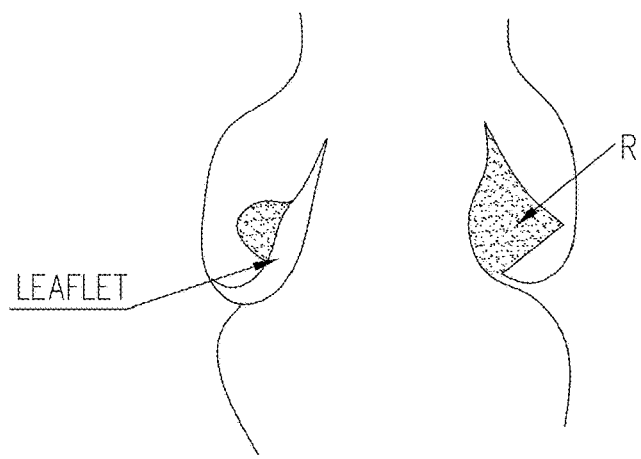
Figure 8D:
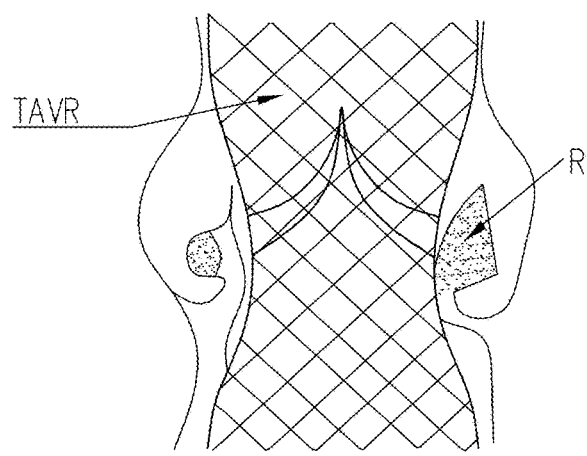
Figure 8E:
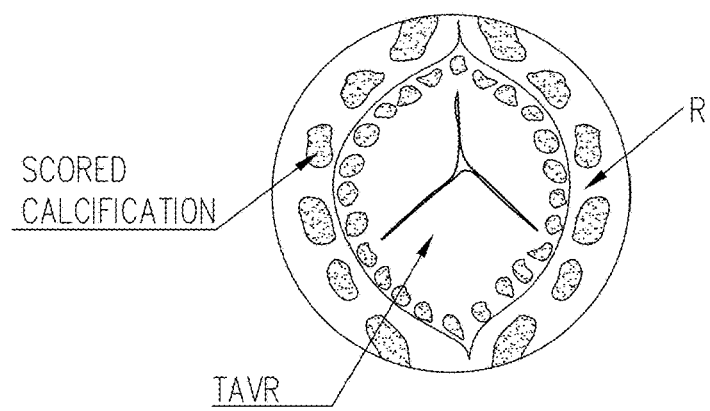

FIG. 8A shows the valve prior to laceration. In FIG. 8B, a laceration or score has been made near the root of the raphe (conjunction of two leaflets) and in the other leaflet. In FIG. 8C, the leaflet and raphe can now be folded to make room for a replacement valve. In FIG. 8D, a TAVR replacement valve is positioned in the native valve annulus and presses against the folded leaflet and raphe. FIG. 8E shows the scored calcifications of the leaflet and raphe, and the TAVR replacement valve secured in place (as in a conventional TAVR procedure).

What is claimed is:

1. A heart valve treatment device comprising:
    a first heart valve treatment member that extends from a first shaft and which comprises a scoring portion;

a second heart valve treatment member that extends from a second shaft and which comprises a counterforce member; and wherein said first and second heart valve treatment members are delivered over a guidewire;

wherein said second heart valve treatment member and said counterforce member are coupled to said second shaft with a brace arranged to bear a force applied by said scoring portion to said counterforce member; and wherein an upper portion of said second shaft is coupled by a link member to a lower portion of said second shaft such that said guidewire is visible between said upper and lower portions of said second shaft.

2. The heart valve treatment device according to claim 1, wherein said brace is tilted with respect to said counterforce member.

3. The heart valve treatment device according to claim 1, wherein an upper portion of said second shaft is coupled by a link member to a lower portion of said second shaft.

4. The heart valve treatment device according to claim 1, wherein said scoring portion is arcuate.

5. The heart valve treatment device according to claim 1, wherein said scoring portion extends from arms of a frame that extends from said first shaft.

6. The heart valve treatment device according to claim 5, wherein said scoring portion and said frame form a closed arcuate structure.

7. The heart valve treatment device according to claim 1, wherein said counterforce member is bent or bendable to align with said scoring portion.

8. The heart valve treatment device according to claim 1, wherein said first and second heart valve treatment members are disposed on said guidewire.

9. The heart valve treatment device according to claim 1, wherein said counterforce member and said scoring portion are not parallel to said guidewire.

10. The heart valve treatment device according to claim 1, wherein one of said first and second heart valve treatment members comprises a blade.

* * * * *